(No Model.)
W. H. SCHUSTER.
STOVE PIPE HOLDER.
No. 459,658. Patented Sept. 15, 1891.
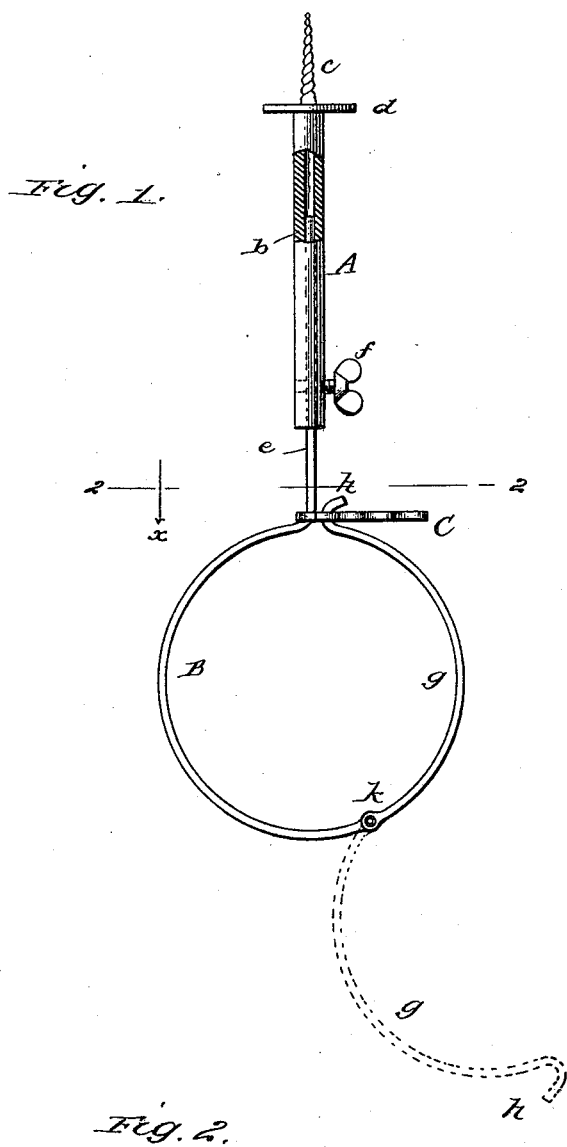
WITNESSES:
W. R. Davis
C. Sedgwick
INVENTOR:
W. H. Schuster
BY Munn & Co.
ATTORNEYS

UNITED STATES PATENT OFFICE.

WILLIAM HERMANN SCHUSTER, OF FOUNTAIN CITY, WISCONSIN.

STOVE-PIPE HOLDER.

SPECIFICATION forming part of Letters Patent No. 459,658, dated September 15, 1891.

Application filed March 2, 1891. Serial No. 383,360. (No model.)

*To all whom it may concern:*

Be it known that I, WILLIAM HERMANN SCHUSTER, of Fountain City, in the county of Buffalo and State of Wisconsin, have invented a new and useful Improvement in Stove-Pipe Holders, of which the following is a full, clear, and exact description.

This invention relates to stove-pipe hangers or holders, such as are used to hang or support said pipes from the ceiling of a room, and which are provided with a jointed or hinged lower loop or band capable of being opened and closed to receive laterally the pipe within it and to provide for the removal of it therefrom when required, such hanger being preferably longitudinally adjustable or extensible to adapt it to various heights or distances of suspension of the pipe from the ceiling; and the invention consists in a novel construction of such device, substantially as hereinafter described, and more particularly pointed out in the claims.

Reference is to be had to the accompanying drawings, forming a part of this specification, in which similar letters of reference indicate corresponding parts in both the figures.

Figure 1 represents a view in elevation of my improved stove-pipe hanger with the tubular stem portion of the device partly in section, and representing by full lines the pipe hanger or holder closed and by dotted lines its pipe-receiving loop or band as open. Fig. 2 is a sectional plan view upon a larger scale on the line 2 2 in Fig. 1, looking in direction of the arrow $x$.

The stem portion A of my improved stove-pipe hanger and fastener is made longitudinally adjustable or extensible—as, for instance, by constructing it with or of a tube $b$, having a headless wood-screw $c$ brazed in its upper end, with or without a washer or plate $d$ at the junction of the screw with the tube and with a sliding straight-stem portion $e$ fitting the interior of the tube, of an opening and closing loop or band B, said portion $e$ being adjustable up or down within the tube $b$ and being held at its required adjustment to adapt the hanger to different heights of the pipe's suspension from the ceiling by a thumb or set screw $f$ in the side of the tube $b$. By taking out this set-screw a nail or rod may be inserted through the hole in the tube, which passes through both sides of the latter to give leverage for screwing the hanger or its tube $b$ into the ceiling or for unscrewing it therefrom when required.

The loop or band B which receives the stove-pipe within it is of sectional and opening and closing construction, as hereinbefore described, it being formed with a hinged portion $g$ for the purpose. When this hinged portion is closed to hold the pipe within it, it is secured or held closed by causing its upper end, which is shaped to form a hook $h$, to engage with any one of a series of notches or corrugations $i$ in a clasp C at different points in its length, and which is fitted to turn upon the stem portion $e$ of the loop or band B. This clasp C, by providing for the hook $h$ to engage with it at different points in its length, admits of the band B closing upon the pipe when the latter is not strictly of regulation size or varies in size, and it secures a firm hold upon the inclosed pipe by the band B. It also forms a very simple and easy fastener or device for opening and closing the band B. The hinged portion $g$ of the band B has its hinge or joint $k$ a little out of line or to one side of the stem portion A of the hanger—that is, on the opening side of the hanger. This prevents the stove-pipe from dropping too freely out of the hanger when the clasp C is loosened. If more than one hanger be used, first one can be opened and then the other and the pipe then lifted in the center to take it down or replace it. Of course any number of these hangers may be used to support or suspend a stove-pipe, and when more than two of such are used they can be arranged to open on opposite sides or in opposite directions, and thereby be made to hold the pipe firmly in place until all the clasps are loosened, when the pipe may be lifted in its center to remove it. The hangers always remain adjusted when once in proper position. No special tools are necessary to change their position or to set up or remove them, and the whole device is simple and very much cheaper in the end and more convenient than fastening the stove-pipe up by wires to the ceiling, and all disfiguration, such as by nails, is avoided.

Having thus described my invention, what I claim as new, and desire to secure by Letters Patent, is—

1. In a stove-pipe hanger or holder having an opening and closing band at its lower end adapted to receive laterally the pipe within it and to provide for its removal therefrom when required, the combination, with the stationary portion of the hanger and the hinged or opening and closing portion of the band having a hook at its upper end, of a clasp carried by the stationary portion of the hanger and having notches or corrugations at different points in its length for engagement of the hook of the opening section of the band with it, substantially as and for the purpose herein set forth.

2. The combination of the tube $b$, having a wood-screw $c$ in its upper end and set-screw $f$ in its side, the band B with its sliding or extensible stem portion $e$ and hinged section $g$, having a hook $h$ at its upper end, and the adjustable clasp C, substantially as shown and described.

WILLIAM HERMANN SCHUSTER.

Witnesses:
J. H. SHERMAN,
HERMANN TROLL.